US010150710B2

(12) United States Patent
Jaffel et al.

(10) Patent No.: US 10,150,710 B2
(45) Date of Patent: Dec. 11, 2018

(54) APPARATUS AND METHOD FOR THE PRODUCTION OF FOAM

(71) Applicant: Saint-Gobain Placo SAS, Suresnes (FR)

(72) Inventors: Hamouda Jaffel, Aulnay-sous-Bois (FR); Richard Morlat, Les Pavillons sous Bois (FR)

(73) Assignee: Saint-Gobain Placo SAS (FR)

( * ) Notice: Subject to any disclaimer, the term of this patent is extended or adjusted under 35 U.S.C. 154(b) by 187 days.

(21) Appl. No.: 15/312,797

(22) PCT Filed: Jun. 4, 2015

(86) PCT No.: PCT/EP2015/062522
§ 371 (c)(1),
(2) Date: Nov. 21, 2016

(87) PCT Pub. No.: WO2015/185700
PCT Pub. Date: Dec. 10, 2015

(65) Prior Publication Data
US 2017/0190630 A1    Jul. 6, 2017

(30) Foreign Application Priority Data

Jun. 5, 2014    (EP) .................................... 14290163

(51) Int. Cl.
*C04B 38/10* (2006.01)
*C04B 28/14* (2006.01)
(Continued)

(52) U.S. Cl.
CPC .......... *C04B 38/10* (2013.01); *B01F 3/04446* (2013.01); *B01F 5/0696* (2013.01);
(Continued)

(58) Field of Classification Search
CPC ......... B28C 5/386; C04B 28/14; C04B 38/10; C04B 38/0051; C04B 38/007; C04B 38/0028; C04B 2103/40; C04B 2103/408; C04B 2103/48; B01F 5/0696; B01F 3/04446; B01F 2215/0047
(Continued)

(56) References Cited

U.S. PATENT DOCUMENTS

| 1,769,275 A | * | 7/1930 | Rice .................... B01F 3/04539 106/646 |
| 2004/0045481 A1 | | 3/2004 | Sethuraman et al. |
| 2009/0169864 A1 | * | 7/2009 | Wang ..................... C04B 24/16 428/319.1 |

FOREIGN PATENT DOCUMENTS

| WO | 9857906 | 12/1998 |
| WO | 0212141 A1 | 2/2002 |

* cited by examiner

*Primary Examiner* — William K Cheung
(74) *Attorney, Agent, or Firm* — Gray Robinson, P.A.; Michael J. Colitz, III (57) ABSTRACT

An apparatus for preparing foam for incorporation into cementitious slurry comprises a conduit having an inlet for receiving a gas feed and a surfactant feed, and an outlet for allowing the exit of foam. The conduit houses a porous plug that provides a partial barrier to fluid flow along the conduit, the plug comprising a plurality of particles that are packed in a regular array and that define a three-dimensional network of pores extending therebetween. The apparatus comprises a resilient component located between the plug and the conduit.

12 Claims, 5 Drawing Sheets

(51) Int. Cl.
  *B28C 5/38*    (2006.01)
  *B01F 5/06*    (2006.01)
  *B01F 3/04*    (2006.01)
  C04B 103/40    (2006.01)
  C04B 103/48    (2006.01)

(52) U.S. Cl.
  CPC .............. *B28C 5/386* (2013.01); *C04B 28/14* (2013.01); *B01F 2215/0047* (2013.01); *C04B 2103/408* (2013.01); *C04B 2103/48* (2013.01)

(58) Field of Classification Search
  USPC ............................................................ 516/9
  See application file for complete search history.

APPARATUS AND METHOD FOR THE PRODUCTION OF FOAM

CLAIM OF PRIORITY

This application is a continuation of and claims priority under 35 U.S.C. § 371 to International Application No. PCT/EP2015/062522 filed on Jun. 4, 2015, which in turn claims priority to EP App. No. 14290163.6 filed on Jun. 5, 2014, the contents of which are incorporated herein by reference for all purposes.

The present invention relates to an apparatus and method for the production of foam, particularly for the production of aqueous foam for use in the manufacture of gypsum board.

Gypsum (calcium sulphate) is a mineral that is found naturally, but that can also be derived synthetically. Gypsum may exist in a number of forms, depending on the level of hydration of the calcium sulphate compound. That is, gypsum may exist e.g. in the dihydrate form ($CaSO_4 \cdot 2H_2O$), the hemihydrate form (also known as stucco), or the anhydrite form. Gypsum may be converted between its different forms through dehydration or rehydration.

The properties of gypsum make it highly suitable for use in industrial and building plasters and other building products such as gypsum wallboard. It is a plentiful and generally inexpensive raw material which, through successive steps of dehydration and rehydration, can be cast, moulded or otherwise formed to useful shapes. For example, gypsum wallboard, also known as plasterboard or drywall, is formed as a set gypsum core sandwiched between paper cover sheets.

Gypsum is generally prepared for use as plaster by grinding and calcining at relatively low temperature (such as from about 120 to 170° C.), generally at atmospheric pressure. This results in partially dehydrated gypsum, typically in the beta crystalline form of the hemihydrate. The beta hemihydrate may be used as a building or construction material by mixing it with water to form an aqueous stucco slurry, paste or dispersion, and then allowing the slurry to set by re-crystallisation from the aqueous medium.

It is known to use foam in the manufacture of gypsum products. The air volume fraction provided by the foam helps to reduce the weight of the gypsum product so that shipping and handling of the product is more cost efficient.

The foam is usually produced by a foam generator that is supplied with an air feed and a surfactant feed. A typical foam generator comprises internal rotating mechanisms to mix the water and the surfactant foaming agent thoroughly to produce foam. In some cases, the rotating blade may be equipped with mixing chambers allowing the nucleation of foam bubbles. Such foam generators are known generally as dynamic foam generators. A typical dynamic foam generator is described in U.S. Pat. No. 4,057,443, which is hereby incorporated by reference.

Other foam generators comprise a tube filled with a permeable porous medium, such as packed beads of fritted glass or ceramic, with controlled pore space. The foam is then produced by introducing a surfactant foaming agent and air simultaneously into the tube. In this case, the structure of the produced foam is then controlled by regulating the applied back pressure onto the tube. Such foam generators are known as static foam generators.

Standard foams used in plasterboard production are usually produced using dynamic type/high shear foam generators. Using this technology, rough manipulation of foam morphology and pore size distribution in the final product may be achieved by exploiting the chemical instability of foaming agents. A typical way of obtaining such instability is by blending different foaming agents with different chemical compositions together. In that case, the foam is commonly called "active". It generates small bubbles (between 50 μm and 100 μm) that will coalesce progressively to produce a polydisperse distribution of large and small bubbles. Typical active foaming agents that could provide this kind of quick coalescence kinetics are the one supplied by GEO Speciality chemicals, under the trade name HYONIC® PFM (8, 10, 15 and 33). A typical chemical composition of these foam agents is described in the U.S. Pat. No. 5,714,001, which is hereby incorporated by reference.

However, excessively large foam bubbles may result in production line instability, due to impaired bonding with the gypsum board liner (commonly known as "blistering"), poor mechanical performance and as well aesthetically inacceptable products.

Surprisingly, it has been found that gypsum products prepared from foam having a monodisperse bubble size distribution (rather than polydisperse foam) may have a better strength-to-weight ratio.

The term "dispersity" is known from polymer science, in which it may be used to denote the heterogeneity of sizes of molecules or particles in a mixture. A collection of objects may be known as "monodisperse" if the objects have substantially the same size, shape, or mass. A set of objects that have an inconsistent size, shape and/or mass may be known as "polydisperse".

Therefore, at its most general, the present invention may relate to the use of monodisperse foam in lightweight building materials and/or methods and apparatus for preparing such monodisperse aqueous foam.

In a first aspect, the present invention may provide a method of preparing a gypsum product, comprising the steps of providing a gypsum stucco slurry, and incorporating a foam into the slurry, wherein the bubble size dispersity index of the foam is below 1.4.

The bubble size dispersity index ($Đ_{X(foam)}$) is calculated as the ratio of the area-weighted average bubble size ($\ddot{X}_w$) to the number average bubble size ($\ddot{X}_N$).

Thus, $Đ_{X(foam)} = \ddot{X}_w / \ddot{X}_N$.

Preferably the bubble size dispersity is below 1.2.

Usually, quantification of foam bubble size distribution relies on 2D image analysis techniques. When these types of techniques are applied to a binary type image, curves of cumulative area against bubble diameter and cumulative number against bubble diameter may be obtained. The inflection points of these curves provide the weight-average bubble size and the number average bubble size respectively.

The foam is typically incorporated into the gypsum stucco slurry in a mixer, e.g. a high shear mixer. The slurry is subsequently extracted from the mixer and caused to set and dry, as is well-known in the art. An example of a gypsum product formed from the slurry may be gypsum plasterboard. Preferably, the plasterboard is a lightweight product having a density lower than 800 kg/m², preferably lower than 560 kg/m².

It has been found that gypsum products prepared using foam having a larger bubble size may have an improved ratio of strength to weight. Therefore, it is preferable that the foam has a mean bubble size of at least 100 μm. It is also preferable that the pores resulting from the incorporation of foam into gypsum have an mean diameter of at least 300 μm, more preferably at least 400 μm.

The foam is produced by passing gas and surfactant feeds along a conduit and through a plug that comprises an internal three-dimensional porous network. The plug is provided by a plurality of particles, e.g. spherical beads, that are arranged in a regular array.

The provision of a three-dimensional porous network helps to ensure that the foam is refined a very large number of times as it passes through the plug, thus helping to achieve a high level of uniformity in the foam bubble size. This may represent a significant improvement relative to known static foam generating apparatus (such as disclosed in U.S. Pat. No. 6,422,734), comprising a plurality of perforated discs disposed along the length of a pipe. Such an arrangement is not able to provide the high number of cycles of refinement that may be possible through use of a three-dimensional porous network.

Therefore, in a second aspect, the present invention may provide an apparatus for preparing foam, comprising a conduit having an inlet for receiving a gas feed and a surfactant feed and an outlet for allowing the exit of foam, the conduit housing a plug that provides a partial barrier to fluid flow along the conduit, the plug comprising a plurality of particles that are packed in a regular array, the particles defining a three-dimensional network of pores extending therebetween, wherein the apparatus comprises a resilient component located between the plug and the conduit.

Typically, the plug comprises a plurality of spherical particles having a substantially identical diameter.

Spherical particles will naturally tend to pack into a generally regular, e.g. crystalline, array, such that each spherical particle typically has 12 other spherical particles as its nearest neighbours. Effectively, the spherical particles are packed together in a manner analogous to atoms in e.g. a hexagonal close-packed or cubic close-packed metal. Such a regular array may comprise localised irregularities e.g. where individual sub-arrays having different orientations meet, but these irregularities only represent a small proportion of the overall arrangement of the particles.

This arrangement results in the voids between the spherical particles having a low variation in size. Thus, the plug tends to promote the formation of generally monodisperse foam, having a well-defined bubble size.

It is preferable that the diameter of the beads is greater than 0.5 mm, preferably greater than 1 mm and smaller than 3 mm, as it has been found that incorporating foam of larger bubble size into gypsum slurry may result in an improved strength to weight ratio of the resultant gypsum product.

Referring to the granular packing theory, the regular arrangement of spherical particles may be described through the close-packed crystallographic model where the minimum gap left by the packing of four identical particles may be quantified by the following relationship:

$$D_G = 0.225 D_S$$

Where $D_S$: is the diameter of the particles, $D_G$: is the diameter of a notional sphere fitting in the gap between four particles arranged at the corners of a notional tetrahedron. For instance, in a regular array of spherical particles of 1 mm size, the minimum gap that will be reached is 225 µm.

It has been found that at the outer lateral surface of the plug, the packing of the particles may become less regular, due to the constraints imposed by the inner surface of the conduit. These "edge effects" may be mitigated by the provision of a resilient component located between the plug and the conduit. The resilient component serves to accommodate outer particles of the plug so as to reduce disruption to the regular arrangement of the particles. Furthermore, the resilient component may serve to apply a compressive force to the plug, thus further enhancing the regular packing of the particles, and reducing the likelihood of gaps in the particle arrangement.

The resilient component may be a sleeve that is located inside the conduit.

Preferably, the apparatus comprises means for applying pressure to the sleeve in a radially inward direction of the sleeve. This helps to ensure that the sleeve is urged against the plug, thus further helping to reduce the incidence of over-sized voids at the surface of the plug. In this case, the conduit may preferably comprise a pneumatic pinch valve. Typical models of commercial pinch valves are the ones manufactured by AKO Innovations SAS, 5 Rue Gilardoni, 68210 Retzwiller, France.

Preferably, a sieve is positioned at the outlet of the conduit, in order to hold the particles within the plug. However, it has been found that the particles may block the apertures in the sieve, thus inhibiting exit of the foam from the conduit. Thus, in a preferred embodiment, the sieve comprises an array of projections that are directed towards the downstream end of the plug, the projections being arranged to provide a corresponding array of apertures therebetween, so as to allow foam to exit the plug. The three-dimensional surface of the sieve thus provided helps to reduce blockage of the sieve apertures by the particles.

Typically, the projections taper inwardly in the direction of the plug. For example, the projections may have a hemispherical shape. In this case, the hemispherical projections are typically arranged in a two-dimensional close-packed array.

Preferably, the diameter of the hemispherical projections is between one and four times the diameter of the plug particles.

Typically, the inlet flares outwardly in a downstream direction of the conduit. Typically, the outlet tapers in a downstream direction of the conduit. Thus, one or both of the inlet and outlet may be e.g. conical in shape. This generally helps to improve flow of gas and surfactant into the conduit and/or improve flow of foam out of the conduit.

In certain embodiments, the apparatus may comprise a duct for introducing a foam additive into the foam.

In a third aspect, the present invention may provide a method of preparing foam, comprising the steps of:

providing an apparatus according to the second aspect of the invention;

supplying a first feed and a second feed to the conduit via the conduit inlet, the first feed comprising a gas and the second feed comprising a surfactant solution; and driving the first and second feed through the plug to form a foam.

Typically, the apparatus comprises a sleeve disposed radially inwardly of the conduit and the method comprises the further step of applying pressure to the sleeve in a radially inward direction of the sleeve, to urge the sleeve against the plug of particles. In this case, the pressure is typically greater than 3 bars. Generally, the pressure is less than 9 bars.

In general, the apparatus is positioned such that the conduit is upright. In this case, the inlet is typically located above the outlet. This may allow for a better distribution of flow within the conduit, reducing any detrimental effects due to gravity.

In general, the gas pressure at the outlet of the conduit is greater than 1 bar. Typically, the pressure is less than 8 bars preferably less than 3 bars.

In general, the method comprises the step of adding a stabilising additive to the foam. For example, the stabilising additive may be a colloidal agent selected from the group of gelatines and farinaceous pastes (for example, a starch paste); a rheology modifier; or a thickening agent (preferred examples of thickening agents are Xanthan gum, Guar gum, alginates, cellulose ether and starch ether).

Typically, the additive is added to the foam after the foam has exited the conduit.

Preferably, the method comprises the further step of incorporating the foam into a hydraulic binder slurry (e.g. a gypsum stucco slurry). The slurry may then be shaped and allowed to set and dry as is well-known in the art.

In a fourth aspect, the present invention may provide a cementitious product, wherein the dispersity of the core porosity is below 1.4.

The pore size dispersity index ($Ð_{X(core)}$) is calculated as the ratio of the area-weighted average pore size ($\ddot{X}_w$) to the number average pore size ($\ddot{X}_N$).

Thus, $Ð_{X(core)} = \ddot{X}_w / \ddot{X}_N$.

Preferably the pore size dispersity lies below 1.2.

The core porosity relates to the porosity at the inner region of the cementitious product, where the pore size and distribution is substantially regular. It excludes the porosity at the surface regions of the cementitious product. Effectively, the core porosity is measured at a depth of at least 5 mm from the as-set surface of the cementitious product.

Preferably, the mean pore size at the core of the cementitious product is at least 300 μm, more preferably at least 400 μm.

Typically, the cementitious product is a gypsum product.

BRIEF DESCRIPTION OF THE FIGURES

The invention will now be described by way of example with reference to the following Figures in which:

FIG. 2b is a schematic section view of the sieve of FIG. 2a.

Figure 1:
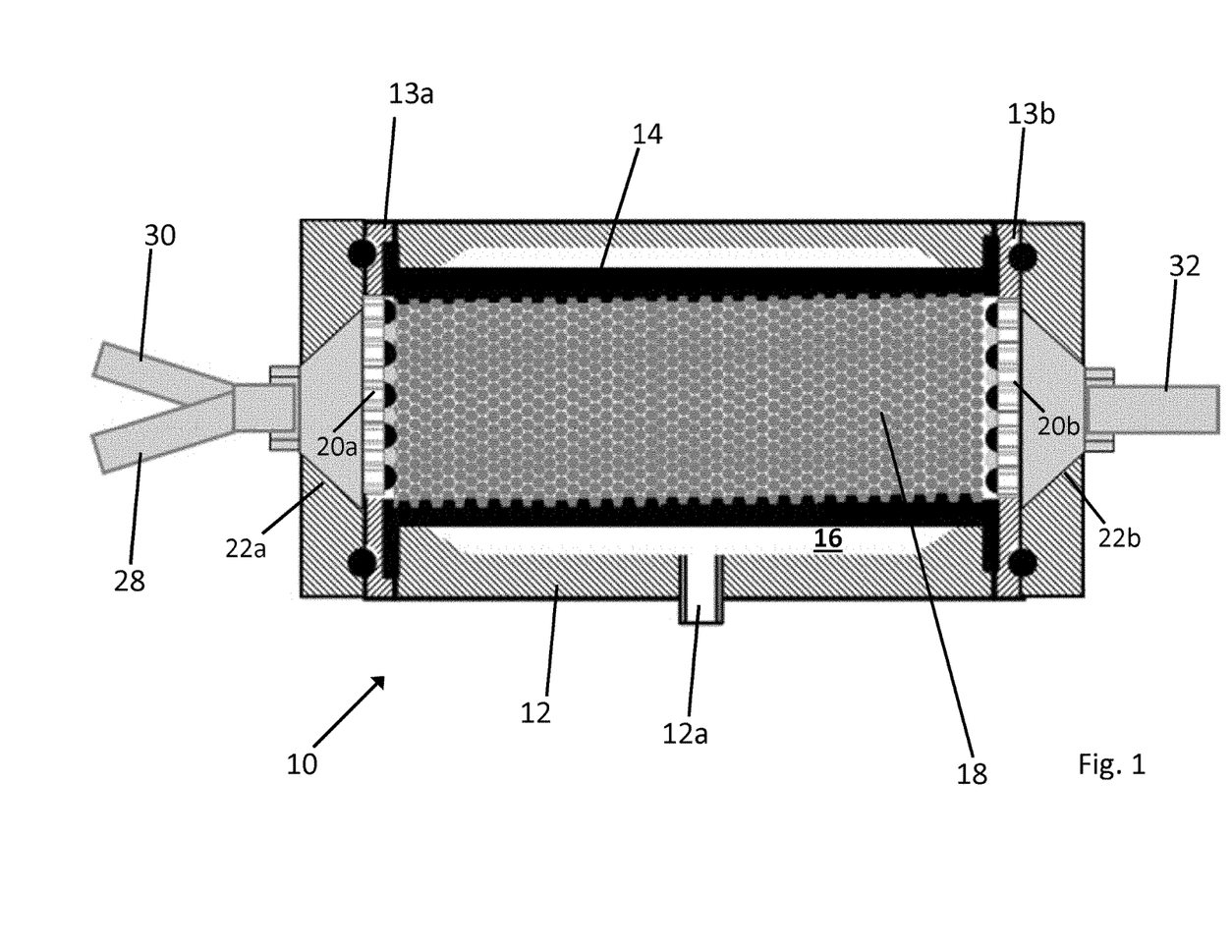
FIG. 1 is a schematic section view of a conduit according to an embodiment of the second aspect of the invention.

Referring to FIG. 1, a pneumatic pinch valve 10 provides a channel for fluid flow. The pinch valve comprises a rigid outer shell 12 and a flexible inner sleeve 14. The rigid outer shell 12 and the flexible inner sleeve 14 are each generally cylindrical in shape, the flexible inner sleeve 14 being provided radially inwardly of the rigid outer shell 12.

The outer shell 12 has flanges 13a,b bolted to each respective end. The inner sleeve 14 is secured at each respective end between the outer shell 12 and a respective flange 13a,b.

The inner sleeve 14 may be formed from an elastomeric material, e.g. rubber.

The outer shell 12 contacts the inner sleeve 14 at each end of the inner sleeve, while the mid-section of the outer shell 12 stands proud from the inner sleeve 14, thus providing a generally ring-shaped gap 16 between the outer shell 12 and the inner sleeve 14.

The outer shell 12 has an air inlet 12a for allowing air into the ring-shaped gap 16.

The inner sleeve 14 houses a plurality of spherical beads that are arranged in a close-packed three-dimensional array to form a plug 18. For example, the beads may be arranged in a three-dimensional hexagonal close packed array, a three-dimensional cubic close packed array, or a mixture of these two packing arrangements. Local packing irregularities may arise, e.g. where sub-arrays having different orientations meet, but overall, the packing of the beads is generally regular.

The bead diameter is generally in the range 1-5 mm, preferably in the range 1-3 mm.

The plurality of beads are supported within the pinch valve 10 by two support sieves 20a,b that are provided at an upstream end of the plug 18 and a downstream end of the plug 18 respectively.

Figure 2A:
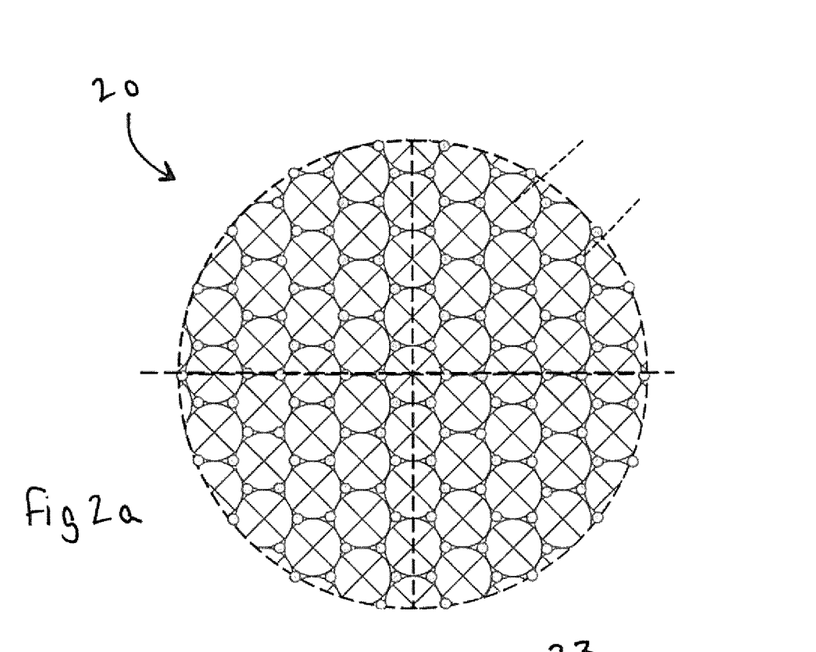
FIG. 2a is a schematic plan view of one of the sieves of the embodiment of FIG. 1.
Figure 2B:
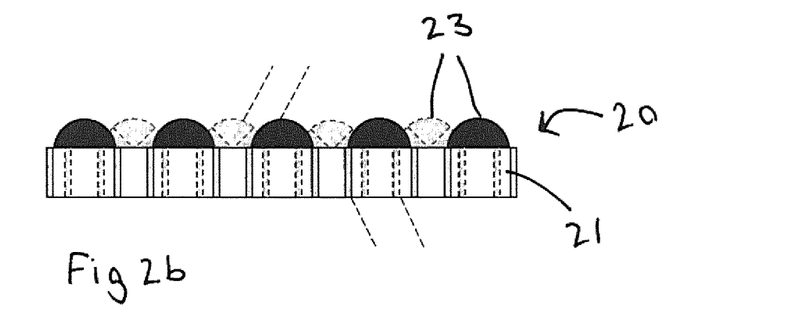

Referring to FIGS. 2a and 2b, each support sieve 20 has a base disc 21 that has hemispherical projections 23 arranged on one side. The hemispherical projections are arranged in a close-packed array such that in the central region of the sieve, each projection contacts six other projections (the projections close to the edge of the sieve each contact fewer other projections, due to edge effects). The gaps between projections define apertures that extend through the thickness of base disc.

The hemispherical projections serve to hold the spherical beads away from the base disc 21, such that the beads are not able to block the apertures in the base disc. Typically, the hemispherical projections have a radius between one and four times the radius of the beads.

An inlet conduit 22a is provided at an upstream end of the pinch valve. The inlet conduit 22a flares outwardly in a downstream direction of the pinch valve.

An outlet conduit 22b is provided at a downstream end of the pinch valve. The outlet conduit tapers in a downstream direction of the pinch valve.

In use, air is provided to the ring-shaped gap 16 to increase the air pressure within the gap to e.g. about 6 bar. The increased pressure causes the inner sleeve 14 to deform in a radially inward direction, such that it is urged against the surface of the plug 18. This helps to reduce the empty spaces between the plug and the inner sleeve, and helps to ensure that edge effects, such as a reduction in packing regularity of the beads, are reduced. Thus, the provision of the inner sleeve helps to promote regular packing of the beads across the entire body of the plug.

Figure 3A:
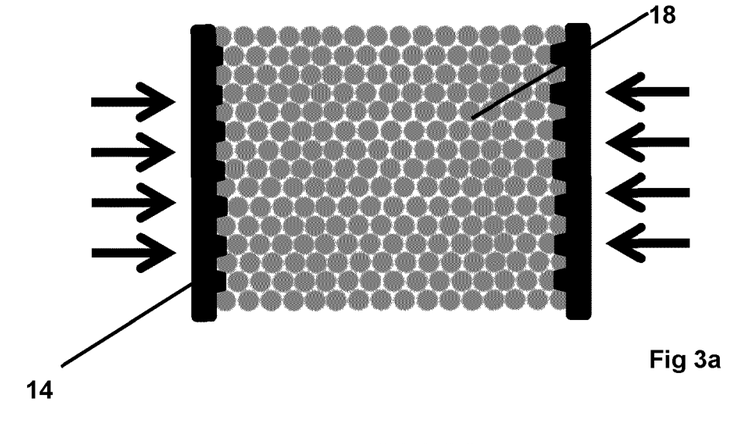
FIG. 3a is a schematic section view of the plug and sleeve of the embodiment of FIG. 1.
Figure 3B:
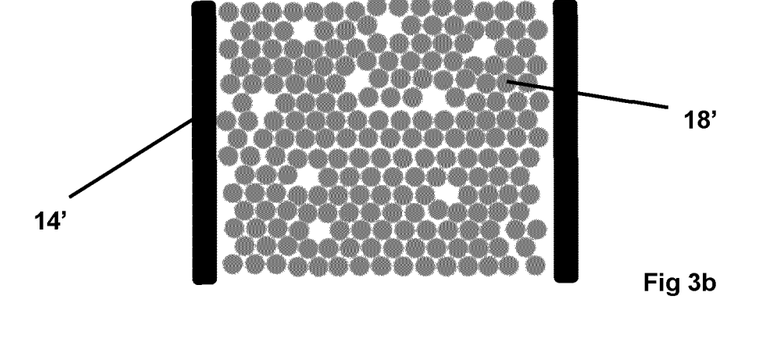
FIG. 3b is a section view of a plug of particles held within a rigid sleeve, according to an illustrative example not forming part of the invention.

The effects of providing a resilient sleeve around the plug 18 and using it to transmit a compressive force onto the plug are illustrated in FIG. 3. FIG. 3b shows a comparative example in which a plug of particles 18' is held in a rigid sleeve 14'. Enlarged voids are present at the edge of the plug due to packing irregularities caused by the inability of the rigid sleeve to accommodate the particles. Furthermore, defects are present in the body of the plug, due to gaps in the array of particles. FIG. 3a shows how the resilient sleeve 14 may help to accommodate particles at the edge of the plug 18, while the application of a compressive force onto the plug assists in reducing defects within the plug.

An air feed 28 and a surfactant solution feed 30 are provided to the inlet conduit 22a and are driven under pressure through the support sieve 20a, the plug 18, and the support sieve 20b to provide a foam feed 32 that exits the pinch valve 10 at the outlet 22b. Typically, the foam pressure at the outlet is about 2 bars.

The pinch valve 10 is positioned such that the outer shell 12 and inner sleeve 14 are upright, and the inlet conduit 22a is above the outlet conduit 22b.

The following worked Examples are presented by way of illustration only.

COMPARATIVE EXAMPLE 1

Foam was generated by passing constant flows of air and foaming agent solution into a foam generator equipped with rotor/stator parts, that is, a dynamic foam generator. The foam generation conditions were set as follow:
Foam generator speed: about 2900 rpm
Rotor/Stator gap: about 0.5 mm
Foaming agent: Hyonic PFM10 foaming agent from GEO Speciality Chemicals (this is an unstable foaming agent)
Foaming agent concentration: about 0.5 wt %
Foam density: about 91 g/l

EXAMPLE 1

Foam was generated by passing air and a foaming agent solution through a static foam generating apparatus of the type shown in FIG. 1. In this case, the foam generation conditions were set as follows:
Filling particles: spherical particles of about 1 mm diameter.
Foam generator counter-pressure: about 2 bar
Pinch valve inner pressure: about 6 bar
Foaming agent: STEOL DES32i from Stepan Company (this is an alkyl ether sulphate-based foaming agent having an average carbon chain length in the range C8-C12)
Foaming agent concentration: about 1 wt %
Foam density: about 91 g/l.

Foamed Slurry Preparation

The pre-generated foams were then gently blended with pre-mixed gypsum stucco slurry in varying proportions to produce multiple gypsum specimens having different levels of density (from 0.5 up to 0.8 g/cm³). Typical slurry compositions are shown in Table 1:

TABLE 1

| | Target dry density (g/cm³) | | | |
|---|---|---|---|---|
| | 0.8 | 0.7 | 0.6 | 0.5 |
| Stucco | 1 | 1 | 1 | 1 |
| Water (weight ratio to stucco) | 0.77 | 0.75 | 0.72 | 0.69 |
| Foam (weight ratio to stucco) | 0.03 | 0.05 | 0.08 | 0.11 |

Results: Quantitative Analysis of Foam Morphology and Microstructure of Gypsum Specimens The morphology of the foam and the core structure of gypsum specimens were analysed in using optical microscopy equipment and ImageJ® software.

Curves 1 and 2 on FIG. 3(a) show the cumulative volume distributions of the foam bubbles generated in Comparative Example 1 and Example 1 respectively. Curves 1' and 2' show the respective first derivatives of the cumulative volume distributions. The volume average bubble size ($\ddot{X}_w$) for Comparative Example 1 and Example 1 is defined by the position of the peak of Curve 1' and Curve 2' respectively.

Similarly, Curves 3 and 4 on FIG. 3(b) show the cumulative number distributions of the foam bubbles generated in Comparative Example 1 and Example 1 respectively. Curves 3' and 4' show the respective first derivatives of the cumulative number distributions. The number average bubble size ($\ddot{X}_n$) for Comparative Example 1 and Example 1 is defined by the position of the peaks of Curve 3' and Curve 4' respectively.

The bubble size dispersity $Ð_{X(foam)}$ is calculated as the ratio of volume average bubble size to the number average bubble size.

Figure 4A:
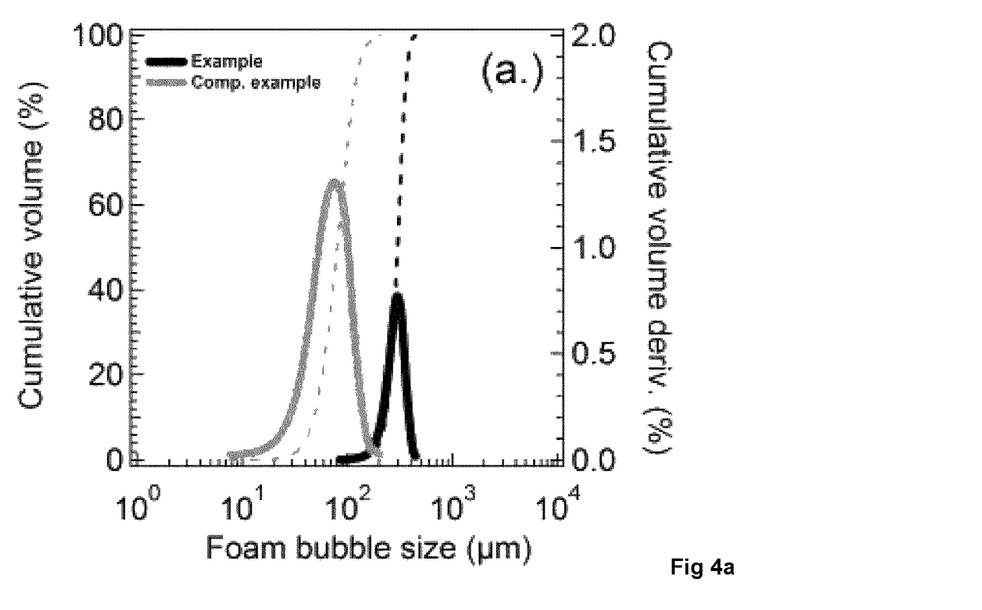
FIGS. 4(a) and (b) are graphs showing the bubble size distributions for foams produced according to Comparative Example 1 and Example 1 in terms of cumulative area and cumulative number respectively.

Curves 5 and 6 on FIG. 4(a) show the cumulative volume distributions of the pores present in the cores of the gypsum specimens prepared in Comparative Example 1 and Example 1 respectively. Curves 5' and 6' show the respective first derivatives of the cumulative volume distributions. The volume average pore size ($\ddot{X}_w$) for the gypsum specimens of Comparative Example 1 and Example 1 is defined by the position of the peak of Curve 5' and Curve 6' respectively.

Figure 4B:
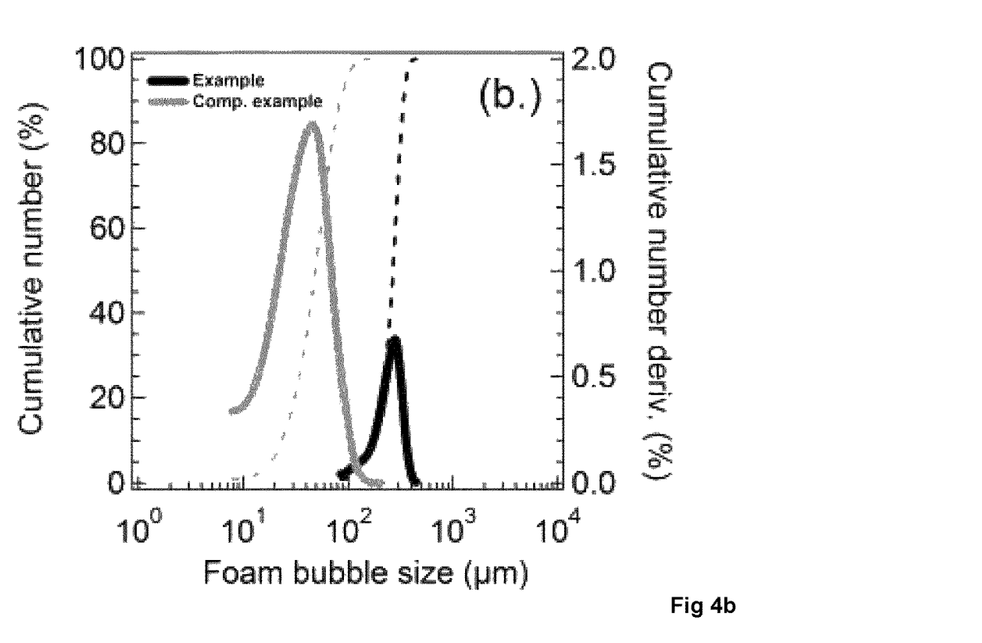
Figure 5A:
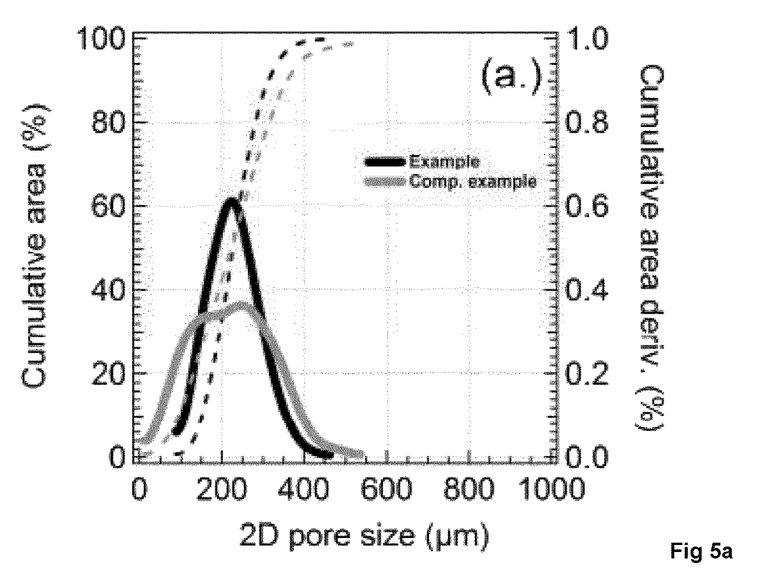
FIGS. 5(a) and (b) are graphs showing the pore size distributions for gypsum specimens produced according to Comparative Example 1 and Example 1 in terms of cumulative area and cumulative number respectively.
Figure 5B:
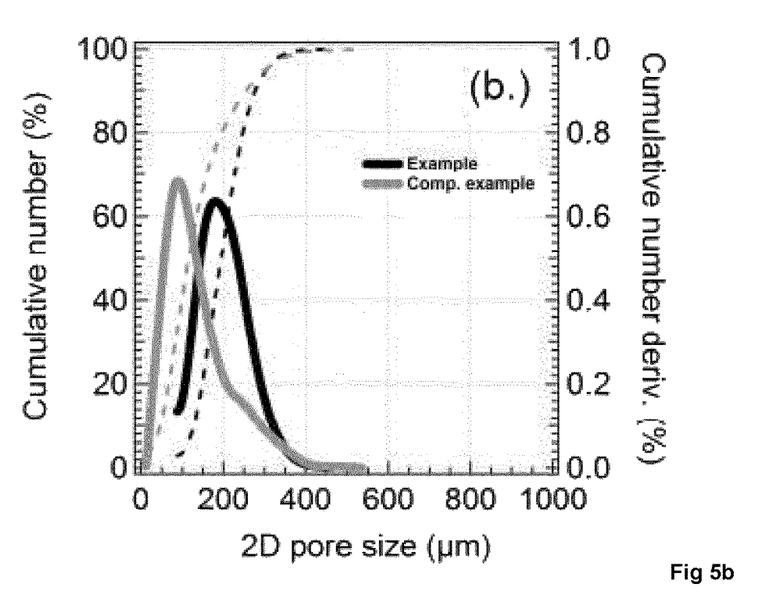

Similarly, Curves 7 and 8 on FIG. 4(b) show the cumulative number distributions of the pores present in the cores of the gypsum specimens prepared in Comparative Example 1 and Example 1 respectively. Curves 7' and 8' show the respective first derivatives of the cumulative number distributions. The number average pore size ($\ddot{X}_n$) for the gypsum specimens of Comparative Example 1 and Example 1 is defined by the position of the peaks of Curve 7' and Curve 8' respectively.

The pore size dispersity ($Ð_{X(core)}$) is calculated as the ratio of volume average pore size to the number average pore size.

TABLE 2

| | | Comparative Example 1 | Example 1 |
|---|---|---|---|
| Foam | $\ddot{X}_w$ (foam) | 81 μm | 298 μm |
| | $\ddot{X}_n$ (foam) | 49 μm | 267 μm |
| | $Ð_x$ (foam) | 1.65 | 1.12 |
| Core structure | $\ddot{X}_w$ (core) | ~335 μm | ~340 μm |
| | $\ddot{X}_n$ (core) | ~174 μm | ~292 μm |
| | $Ð_x$ (core) | 1.92 | 1.16 |

Results: Mechanical Testing

The indentation strength results for Comparative Example 1 and Example 1 are set out in Table 3. The test consists of measuring the indentation strength using a spherical head indenting tool of about 8 mm diameter. The indentation strength (called also rigidity) corresponds to the slope of the curve relating the strain (N) versus the deformation (mm).

TABLE 3

| | Normalised indentation rigidity (N/mm) | |
|---|---|---|
| Core density (g/cm³) ± 0.02 | Comparative Example 1 | Example 1 |
| 0.8 | 100% | 120% |
| 0.7 | 100% | 140% |
| 0.6 | 100% | 160% |
| 0.5 | 100% | 200% |

The invention claimed is:

1. Apparatus for preparing foam for incorporation into cementitious slurry, comprising a conduit having an inlet for receiving a gas feed and a surfactant feed, and an outlet for allowing the exit of foam, the conduit housing a porous plug that provides a partial barrier to fluid flow along the conduit, the plug comprising a plurality of particles that are packed in a regular array, the particles defining a three-dimensional network of pores extending therebetween, wherein the apparatus comprises a resilient component located between the plug and the conduit.

2. Apparatus according to claim 1, wherein the resilient component comprises a sleeve disposed on a radially inward side of the conduit.

3. Apparatus according to claim 1, wherein the outlet comprises a sieve, the sieve comprising an array of projections that are directed towards the downstream end of the plug, the projections being arranged to provide a corresponding array of apertures therebetween, so as to allow foam to exit the plug.

4. Apparatus according to claim 3, wherein the projections are hemispherical.

5. Apparatus according to claim 4, wherein the diameter of the projections is between one and four times the diameter of the spherical particles.

6. Apparatus according to claim 1, wherein the outlet tapers in a downstream direction of the conduit, and/or the inlet flares outwardly in a downstream direction of the conduit.

7. A method of preparing foam for incorporation into gypsum slurry, comprising the steps of:

providing an apparatus according to any one of the preceding claims;

supplying a first feed and a second feed to the conduit via the conduit inlet, the first feed comprising a gas and the second feed comprising a surfactant; and driving the first and second feed through the plurality of particles to form a foam.

8. A method according to claim 7, further comprising the step of applying pressure to the sleeve in a radially inward direction of the sleeve, to urge the sleeve against the plug of beads.

9. A method according to claim 8, wherein the pressure is in the range 3-9 bar.

10. A method according to claim 7, wherein the gas pressure at the outlet of the conduit lies in the range 1-3 bar.

11. A method according to claim 7, further comprising the step of adding a stabilising additive to the foam.

12. A method according to claim 7, comprising the further step of incorporating the foam into a hydraulic binder slurry, such as a gypsum slurry.

* * * * *